United States Patent [19]

Suzuki et al.

[11] Patent Number: 5,710,988
[45] Date of Patent: Jan. 20, 1998

[54] MOBILE DATA COMMUNICATION DEVICE

[75] Inventors: Makoto Suzuki; Takemi Yamamoto, both of Nagoya, Japan

[73] Assignee: Brother Kogyo Kabushiki Kaisha, Nagoya, Japan

[21] Appl. No.: 665,797

[22] Filed: Jun. 18, 1996

[30] Foreign Application Priority Data

Jul. 12, 1995 [JP] Japan ................... 7-176157

[51] Int. Cl.⁶ .................................................. H04B 1/38
[52] U.S. Cl. ........................ 455/90; 455/575; 455/572
[58] Field of Search .............................. 455/89, 90, 95, 455/127, 128, 347, 349, 351, 66, 344, 151.2, 556, 557, 573, 572, 575; 359/145, 146, 172, 152

[56] References Cited

U.S. PATENT DOCUMENTS

| 3,725,887 | 4/1973 | Sneider | 455/95 |
| 4,291,411 | 9/1981 | Muller et al. | 455/152.1 |
| 4,897,883 | 1/1990 | Harrington | 359/145 |
| 4,910,795 | 3/1990 | McCowen et al. | 455/128 |
| 4,989,260 | 1/1991 | Meade | 455/95 |
| 5,617,002 | 4/1997 | Sakamoto . | |

*Primary Examiner*—Chi H. Pham
*Assistant Examiner*—Gertrude Arthur
*Attorney, Agent, or Firm*—Oliff & Berridge, P.L.C.

[57] ABSTRACT

When a mobile data communication device is rocked due to an input/output operation, a rotary shaft of a generator coupled with a weight is rotated, and power is generated. The generated power is stored in a capacitor. The power stored in the capacitor is controlled to constant voltage by a voltage stabilizing circuit and is supplied to a control circuit. In the control circuit, based on information inputted in a pointing device by supplied power, data are transmitted and received with an external data processing device through an infrared data transmitting/receiving device. Alternatively, power may be supplied from the outside of the mobile data communication device by electromagnetic induction. According to the above-mentioned configuration, not using a battery or a wire system, the mobile data communication device is capable of easily supplying power.

27 Claims, 6 Drawing Sheets

MOBILE DATA COMMUNICATION DEVICE

BACKGROUND OF THE INVENTION

1. Field of the Invention

The present invention relates to a mobile input/output device that is portable. This invention particularly relates to a mobile data communication device that requires no external or replaceable power source.

2. Description of Related Art

In the prior art, a wire system or a battery has been used as a power supply system for a portable mobile input/output device, generally known as a data communication device. When a wire system is used as the power supply system, however, although electric power can be reliably supplied, wiring is troublesome and its use is not easy because it requires additional parts and an easily accessible power source to plug in to.

On the other hand, if a battery is used as the power supply system, although the user is relieved from troublesome wiring, the battery must be exchanged every time it runs low, which causes extra work. Also, the battery itself is comparatively high in cost.

SUMMARY OF THE INVENTION

To solve at least the above-mentioned problems in the prior art, an object of the embodiments of the present invention is to provide a mobile data communication device where electric power can be easily supplied without using a battery or a wire system. This invention includes a self contained power generating device.

To attain the foregoing object, a mobile data communication device of the present invention comprises a body frame that forms a holding part held by the hand of an operator, a data communication device in the form of an input device and/or a data output device provided at the end portion of the body frame, a control circuit provided within the body frame, and a power generating device provided within the body frame for supplying power to the control circuit. The power generating device does not have electric contacts to an external power source and does not need to be exchanged in the body frame.

In one embodiment, the power generating device is formed as a generator for generating power based on rotation of a rotary shaft. The rotary shaft of the generator may be arranged nearly coincident with the longitudinal direction of the body frame.

When the generator is arranged so that the rotary shaft of the generator is nearly coincident with the longitudinal direction of the body frame forming the holding part, the body frame may be rocked because of the input or output operation. Then, a weight connected to the shaft of the generator is rocked and the rotary shaft of the generator is rotated. Thereby, power can be generated efficiently.

Also, the power generating device of the mobile data communication device, in addition to the above-mentioned configuration, may be provided with a storage device for storing power generated by the generator, a rectifier circuit, a voltage stabilizing circuit and an indicator device that reports on residual charge quantity of the storage device. The indicator device may be, for example, a light emission diode.

Also, in the mobile data communication device of the present invention, since the storage device stores power generated in the generator, even when the device is not operated, power is supplied to each circuit. Since the indicator device is designed to inform a user of the residual charge quantity of the storage device, the user can be aware of the deterioration of power of the storage device.

Further, since a storage device is provided for storing power generated in the generator, even when the device is not operated, power is generated and the storage content can be held. Thus, the possibility that the generated power is varied depending on the manner of rocking of the data communication device causing data transmission/reception to become unstable can be prevented.

The body frame of the mobile data communication device may be provided with an infrared data transmitting/receiving device performing the data transmission/reception to an external device. The input device may be a pointing device.

The power generating device may be provided within the body frame and supplied with power from the outside by a cordless transmission system such as a radio system. Alternatively, it may consist of an induction coil provided within the body frame. Also, at least a portion of the power generating device may be installed separately from the body frame of the mobile data communication device. The power supply device may be provided with a base part having an enclosing part holding the body frame thereon, another (second) induction coil provided on the base part for supplying power to the internal (first) induction coil by electromagnetic induction, and a power source supplying power to the second induction coil. The base part may be provided with an enclosing part for enclosing the body frame constituting the holding part, such that the first induction coil and the second induction coil are nearly coincident in the direction of the magnetic field of the electromagnetic induction.

In this configuration, the power generating device may also be provided with a storage device for storing the induction electromotive force generated in the first induction coil, a rectifier circuit, a voltage stabilizing circuit, and an indicator device that reports the residual charge quantity of the storage device. Again, the indicator device may consist of a light emission diode.

Due to variation of the magnetic field generated from the first induction coil connected to the power source, the magnetic field passing through the second induction coil is varied. Thereby, AC electromotive force is generated in the second induction coil within the body frame constituting the holding part.

The enclosing part provided in the base part encloses the body frame in the state that the first induction coil and the second induction coil are nearly coincident in the direction of the magnetic field of the electromagnetic induction. Thus, while the mobile data communication device is not used, charging to the storage device can be performed efficiently by the induction electromotive force. Since the storage device stores power supplied from the power supply device, even when the body frame is not enclosed in the enclosing part of the base part, power is supplied to each circuit.

As clearly seen from the above description, the mobile data communication device of the present invention comprising a body frame constituting a holding part held by hand and a power generating device and a control circuit contained in the body frame, power can be generated efficiently. Also, the generator can be easily assembled within the body frame constituting the holding part. Accordingly, exchanging of a battery, as required in the prior art, becomes unnecessary. Further, troublesome wiring, as in the case of using a prior art wire system, becomes unnecessary.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Embodiments of a mobile data communication device of the present invention will be described based on the accompanying drawings as follows.

Figure 1:
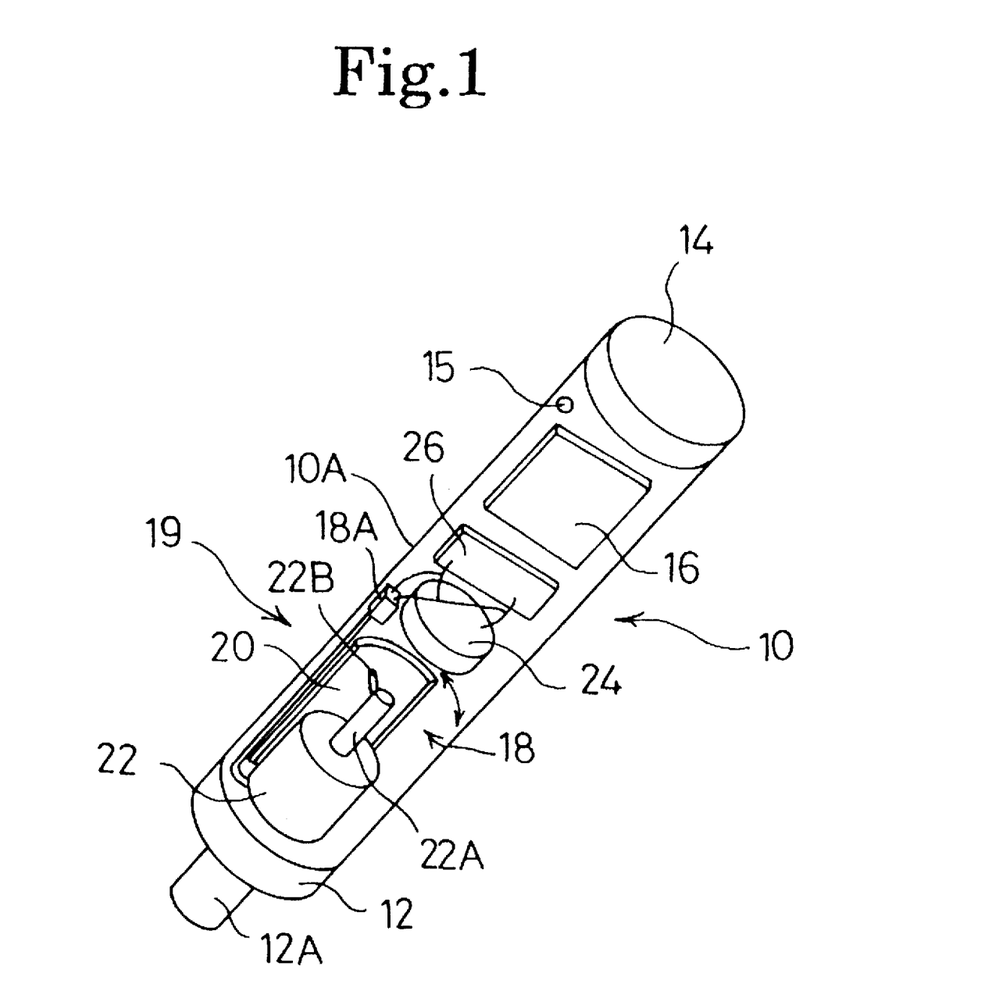
FIG. 1 is a perspective view showing schematic configuration of a mobile data communication device in a first embodiment of the invention.

As shown in FIG. 1, a mobile data communication device 10 in a first embodiment of the present invention is in pen-like shape comprising a cylindrical body frame 10A that forms a holding part grasped by a user by hand during the operation. A pointing device 12 is installed at the front end (lower end portion as seen in FIG. 1) of the body frame 10A, and an external data processing device (not shown) and an infrared data transmitting/receiving device 14 for transmitting and receiving data are installed at the rear end (upper end portion as seen in FIG. 1) of the body frame 10A. Also, a control circuit 16 and a power supply device 19 are installed in the inside of the body frame 10A. A charge quantity deterioration display LED 15 for reporting the deterioration of the charge quantity is installed at upper side of the body frame 10A.

The power supply device 19 is provided with a generating device 18, which comprises a generator 22 for generating power attendant on rotation of a rotary shaft 22A, and a weight 20 fixed to the rotary shaft 22A of the generator 22 by an arm 22B. The rotary shaft 22A and attached weight 20 are rotatable in response to movement of the mobile data communication device 10. The weight 20 is rotated in response to movement of the mobile data communication device 10 which thereby rotates shaft 22A of the generator 22. The generator 22 is an AC generator and has similar structure as that of an electric motor and generates electromotive force by variation of the magnetic field passing through a coil attendant on rotation of the rotary shaft 22A.

Here, the generator 22 is arranged so that the rotary shaft 22A is nearly coincident with the longitudinal direction of the body frame 10A constituting the holding part of the mobile data communication device 10. The generator 22 is not necessarily limited to an AC generator but may be a DC generator.

Figure 2:
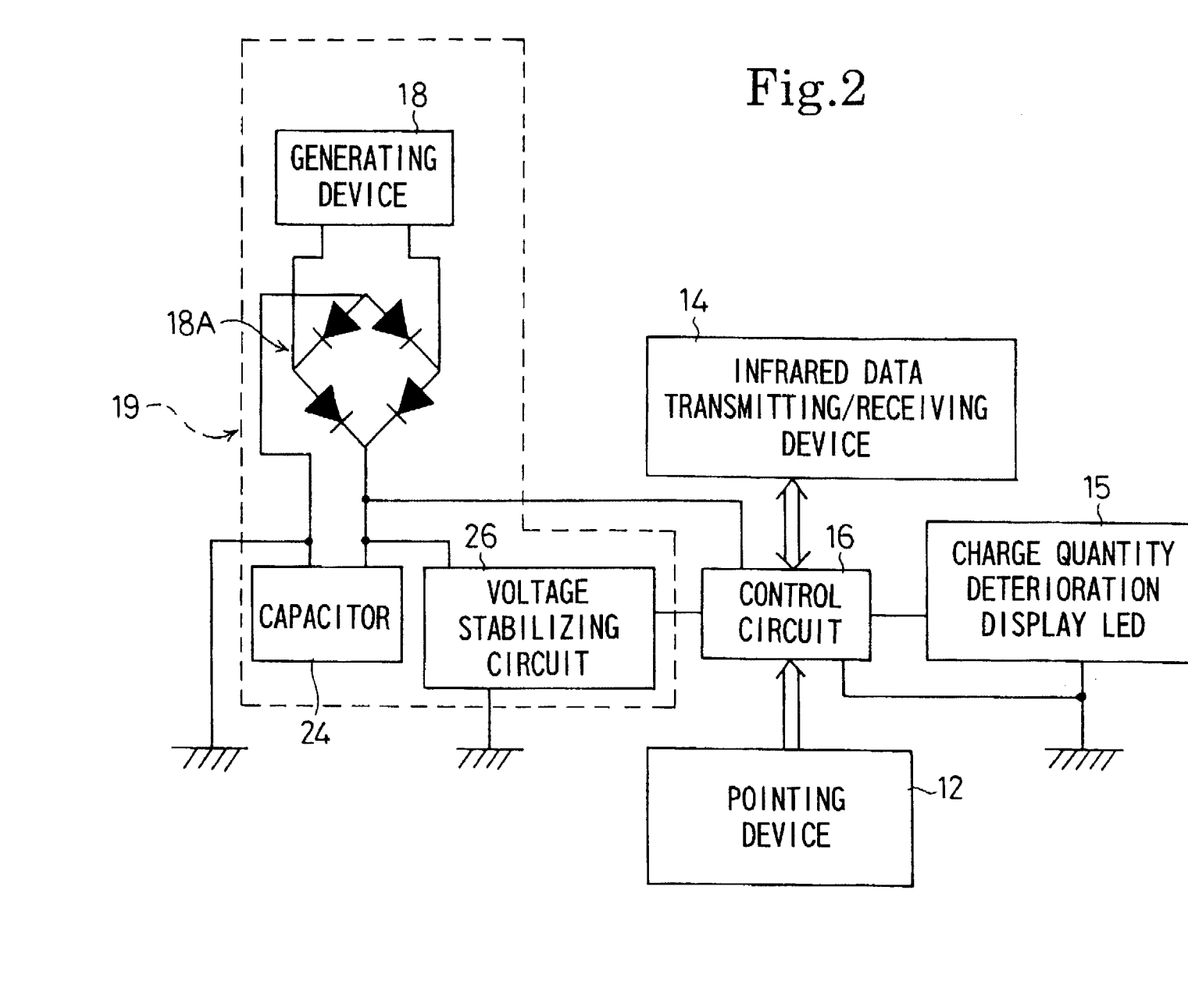
FIG. 2 is a block diagram showing circuit configuration of the first embodiment of the invention.

As shown in a block diagram of FIG. 2, the generating device 18 is connected through a diode bridge 18A to a capacitor 24, which is connected through a 1D voltage stabilizing circuit 26 to the control circuit 16 and supplies power thereto.

Here, the power supply device 19 includes the generating device 18, the diode bridge 18A, the capacitor 24 constituting the storage device of the present invention, and the voltage stabilizing circuit 26 as seen by the dashed box in FIG. 2. The voltage stabilizing circuit 26 has a general circuit configuration using a Zener diode and maintains the output voltage of the capacitor 24 to a prescribed value for stabilizing. In addition, the voltage stabilizing circuit 26 may be formed as a regulator IC, such as a three-terminal regulator. The capacitor 24 can be a capacitor of large capacity, and various sorts of secondary battery, such as a nickel-cadmium battery or a nickel-hydrogen battery, can be utilized.

The pointing device 12, the infrared data transmitting/receiving device 14 and the charge quantity deterioration display LED 15, which functions as the communication device of the present invention, are connected to the control circuit 16.

In the pointing device 12, a system of detecting displacement of the front end 12A of the pointing device 12 by a strain sensor utilizing a piezoelectric element is adopted. Alternatively, in the pointing device 12, an input device 82, shown in FIG. 7 with a system of inputting rotation of a movable ball 86 through a plurality of rotary encoders, as in a mouse, may be used. The pointing device 12 is not limited to the above-mentioned two methods but other detecting means may be used.

In operation of the mobile data communication device of the first embodiment, the user holds the body frame 10A, which forms the holding part, by hand and rocks the mobile data communication device 10 due to the data communication, which can be an input or output operation. As a result, the weight 20 of the body frame 10A is rocked, the rotary shaft 22A of the generator 22 coupled with the weight 20 is rotated, and the generator 22 generates power. The generated power is rectified in full-wave rectification by the diode bridge 18A and is stored in the capacitor 24. The power stored in the capacitor 24 is stabilized to a constant voltage by the voltage stabilizing circuit 26 and is supplied to the control circuit 16. In the control circuit 16, based on information inputted in the pointing device 12 by the supplied power, data are transmitted and received with the external data processing device through the infrared data transmitting/receiving device 14.

Since the usual inputting is frequently performed while the front end of the mobile data communication device 10 is rocked, the rotary shaft 22A of the generator 22 is arranged so that the rotary shaft 22A is nearly coincident with the longitudinal direction of the body frame 10A. Thereby, the weight 20 can be rotated efficiently resulting in efficient power generation. The generator 22 can also be easily assembled within the body frame 10A.

The control circuit 16 detects voltage from the capacitor 24. When the voltage becomes lower than a predetermined reference value, the charge quantity deterioration display LED 15 is turned on and off, which informs the user of the deterioration of the charge quantity. Thereby, the user is aware of the deterioration of the charge quantity of the capacitor 24. In addition, determination of the deterioration of voltage may be performed by providing a comparator in the control circuit 16. Also, reporting of the deterioration of the charge quantity may be performed by using other reporting methods, such as a buzzer or vibration.

Thus according to the first embodiment, the front end of the mobile data communication device 10 is rocked, as normally occurs when performing the usual input operation, thereby easily supplying power.

Further, since the capacitor 24 stores the power generated in the generator 22 even when the input/output device is not operated, power is supplied to the device, and the storage contents can be maintained. Variable power generation due to erratic rocking of the input/output device, resulting in unstable data transmission/reception, can be prevented.

Figure 3:
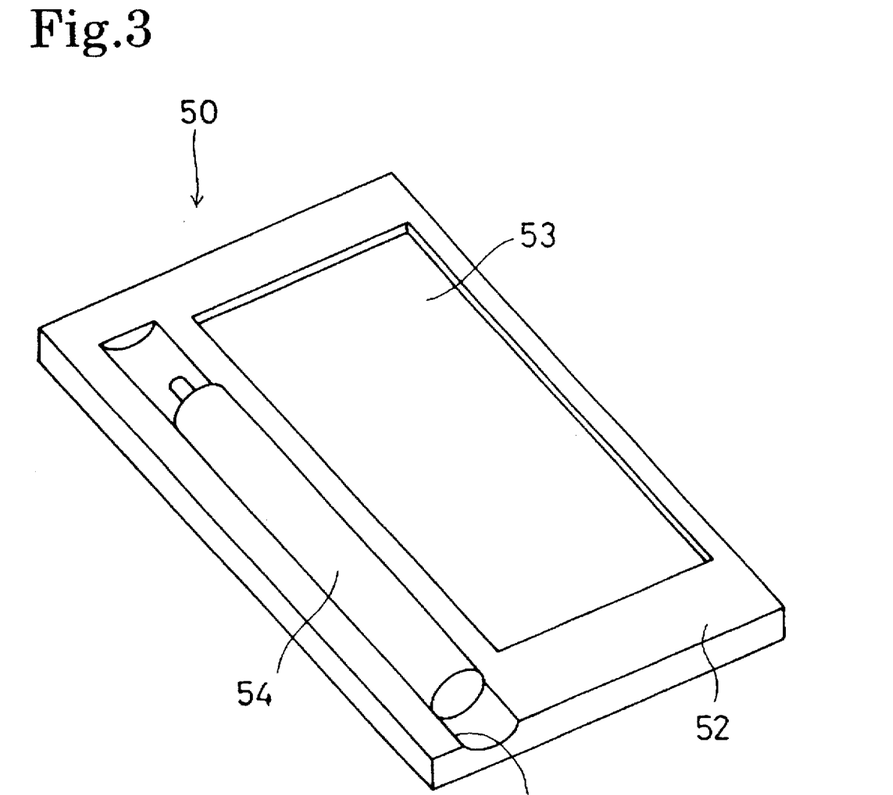
FIG. 3 is a perspective view of a mobile data communication device in a second embodiment of the invention.
Figure 4:
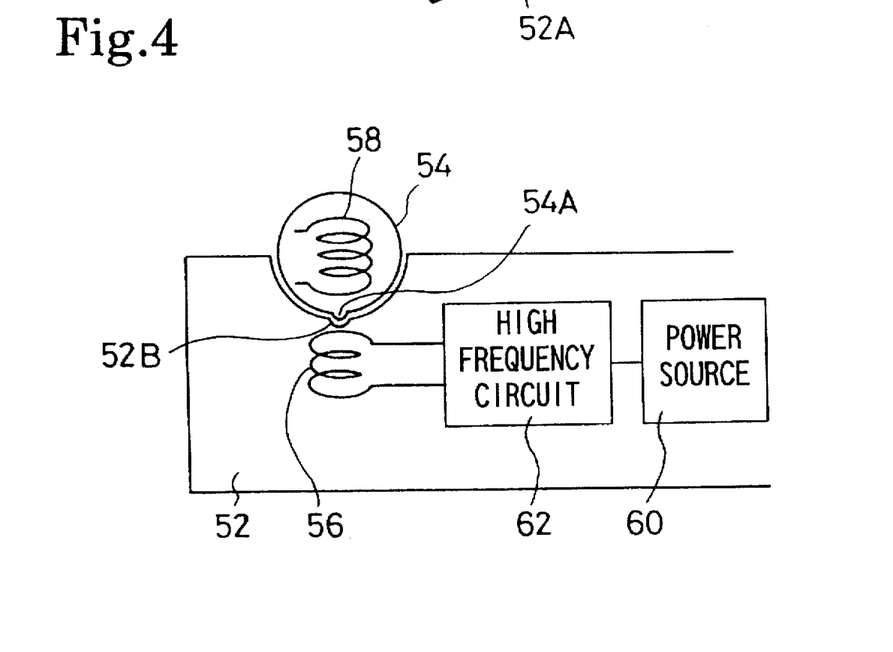
FIG. 4 is a partial schematic view showing a power supply device of the mobile data communication device in the second embodiment.

Next, a second embodiment of the present invention will be described based on FIG. 3, which utilizes a cordless transmission system, such as a radio system. A mobile data communication device 50 comprises a base part 52 having a display function embodied as a liquid-crystal display plate 53 and a body frame 54 functioning as a holding part in a pen-like shape. The body frame 54 can be secured in a receiving part 52A provided in the base part 52. Further, as shown in FIG. 4, induction coils 56, 58 are contained within the base part 52 and the body frame 54 respectively. The induction coils 56, 58 are arranged nearly coincident in the axial direction when the body frame 54 is received in the base part 52. Thereby, both induction coils 56, 58 are nearly coincident in the direction of the magnetic field of the electromagnetic induction, and the power can be supplied efficiently.

In addition, in this embodiment, a convex protruding portion or rib 54A is formed on the body frame 54 and a concave depressed portion or groove 52B that mates with the convex portion 54A is formed on the receiving part 52A of the base part 52, so that the induction coils 56, 58 are arranged nearly coincident in the axial direction securely. For purposes of this description, the induction coil 56 constitutes the first induction coil of the present invention, and the induction coil 58 constitutes the second induction coil of the present invention.

Figure 5:
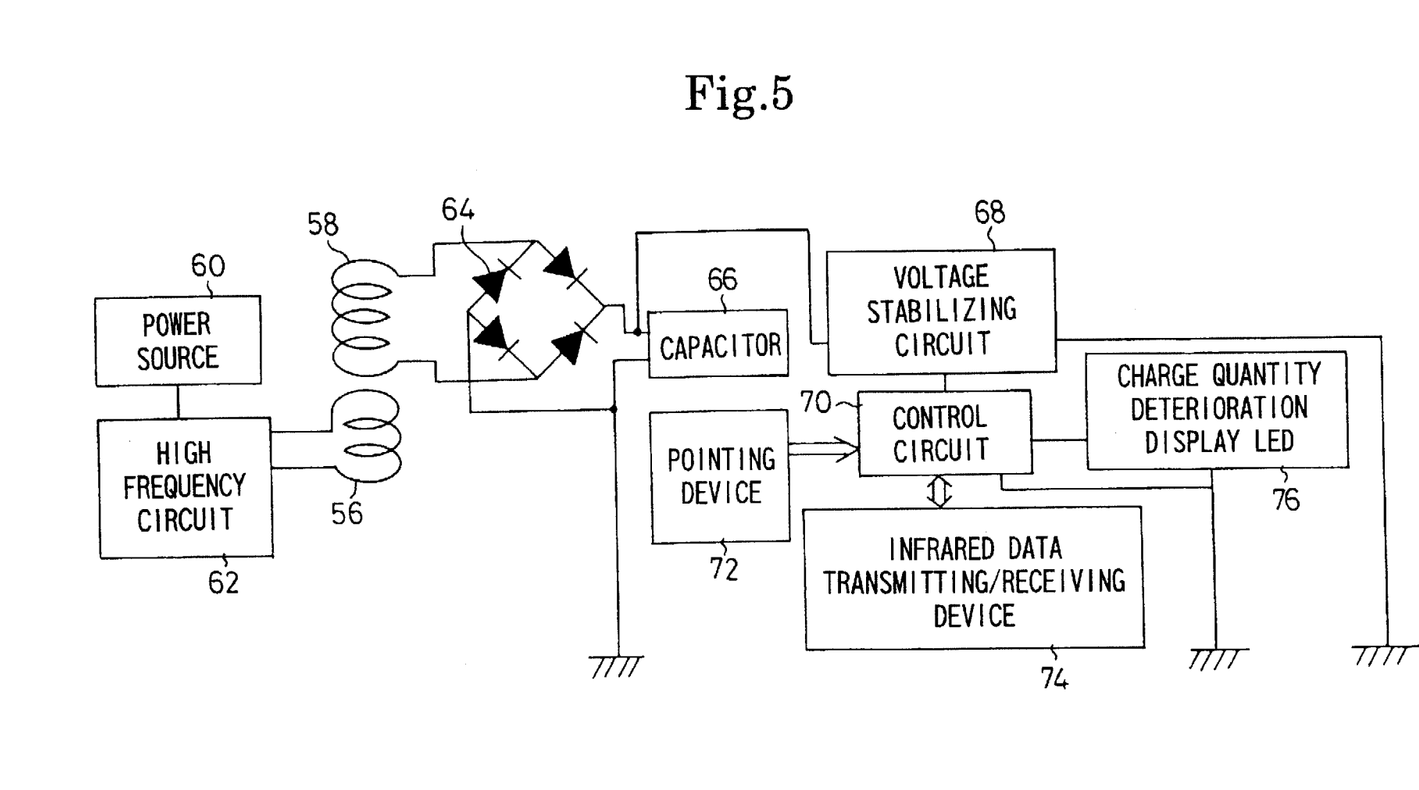
FIG. 5 is a block diagram showing circuit configuration of the second embodiment.

Next, referring to the block diagram of FIG. 5, circuit configuration of the mobile data communication device of the second embodiment will be described. A power source 60 is connected to the induction coil 56 at the side of the base part 52 through a high frequency circuit 62. A capacitor 66 is connected to the induction coil 58 at the side of the body frame 54 through a diode bridge 64. A control circuit 70 is connected to the capacitor 66 through a voltage stabilizing circuit 68. Further, a pointing device 72, an infrared data transmitting/receiving device 74 and a charge quantity deterioration display LED 76 are connected to the control circuit 70. The capacitor 66 constitutes the storage device of this embodiment of the present invention, and the charge quantity deterioration display LED 76 constitutes the indicator of this embodiment of the present invention. In addition, the voltage stabilizing circuit 68 can be configured similar to the voltage stabilizing circuit 26 in the first embodiment.

Here, both induction coils 56, 58, the diode bridge 64, the capacitor 66 and the voltage stabilizing circuit 68 form the power generating device of the present invention.

Figure 7:
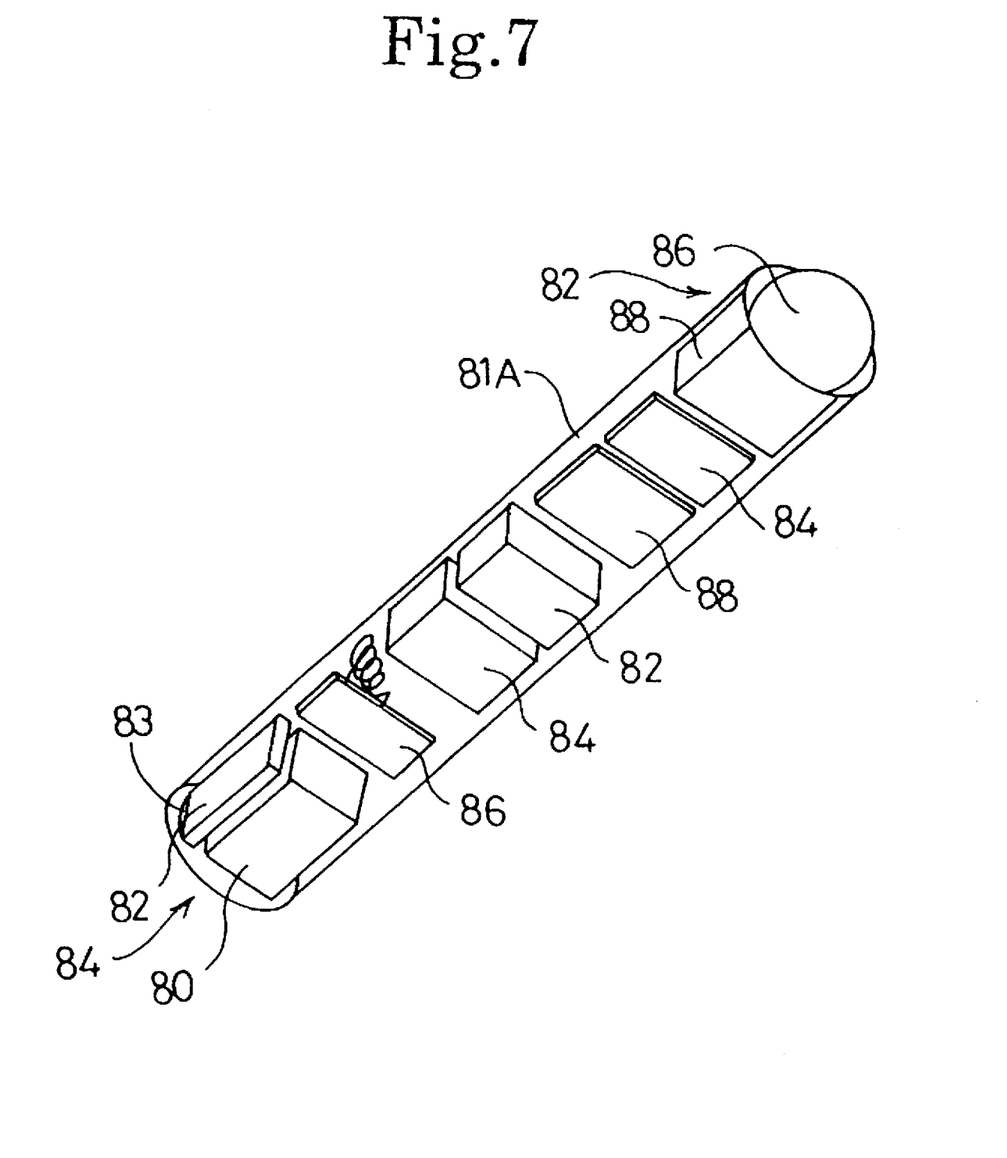
FIG. 7 is a perspective view showing another embodiment of the invention.

In addition, in the pointing device 72, in similar manner to the first pointing device 12, a system of detecting the displacement of the front end 12A of the pointing device 12 by a strain sensor utilizing a piezoelectric element is adopted. Also, in the pointing device 12 as shown in FIG. 7, a system of inputting rotation of a movable ball 86 through a plurality of rotary encoders, such as in a mouse or a track ball, may be used. Further, the pointing device 12 is not limited to the above-mentioned two methods but other detecting means may be used.

Also in the capacitor 66, similar to the capacitor 24 in the first embodiment, a capacitor of large capacity and a secondary battery such as a nickel-cadmium battery or a nickel-hydrogen battery can be utilized.

Operation of the mobile data communication device of the second embodiment in the above-mentioned configuration will be described.

When the body frame 54 constituting the holding part is held in the receiving part 52A of the base part 52, the power of the power source 60 of the base part 52 is converted from DC into AC by the high frequency circuit 62 and is supplied to the induction coil 56. Due to variation of the magnetic field generated from the induction coil 56 at the side of the base part 52, the magnetic field passing through the induction coil 58 at the side of the body frame 54 constituting the holding part is varied. Thereby, the induction electromotive force is generated in the induction coil 58 at the side of the body frame 54 constituting the holding part. When applied voltage of the induction coil 56 at the side of the base part 52 is made $e_1$ and current is made $I_1$, the induction voltage $e_2$ and the current $I_2$ at the side of the body frame 54 can be estimated by the following formulas:

$$e_1 = L_1 \cdot dI_1/dt + M \cdot dI_2/dt \qquad (1)$$

$$e_2 = M \cdot dI_1/dt + L_2 \cdot dI_2/dt, \qquad (2)$$

where t represents time, $L_1$, $L_2$ represent self inductance of the induction coils 56, 58 at the side of the base part 52 and at the side of the body frame 54 respectively, and M represents mutual inductance. Since the induction electromotive force is AC, it is converted into DC by the diode bridge 64 and is stored in the capacitor 66. The power stored in the capacitor 66 is made a constant voltage by the voltage stabilizing circuit 68 and is supplied to the control circuit 70. In the control circuit 70, based on information inputted in the pointing device 72 by the supplied power, data are transmitted and received with the external data processing device through the infrared data transmitting/receiving device 74.

Also, the control circuit 70 detects voltage from the capacitor 66. When the voltage becomes lower than the reference value previously determined, the charge quantity deterioration display LED 76 is turned on and off, and the user is informed of the charge quantity deterioration. Thereby, the user can easily know the deterioration of the charge quantity of the capacitor 66. In addition, decision of the deterioration of the voltage of the capacitor 66 may be performed by providing a comparator in the control circuit 70. Also, reporting the deterioration of the charge quantity may be performed by using a method such as a buzzer or vibration, besides the LED.

Thus, according to the mobile data communication device in the second embodiment, since the power can be supplied in a radio system by the induction coils 56, 58, troublesome wiring, as in the case of a wire system, need not be performed. Also, battery exchanging is not required, and the power can be supplied easily.

Figure 6:
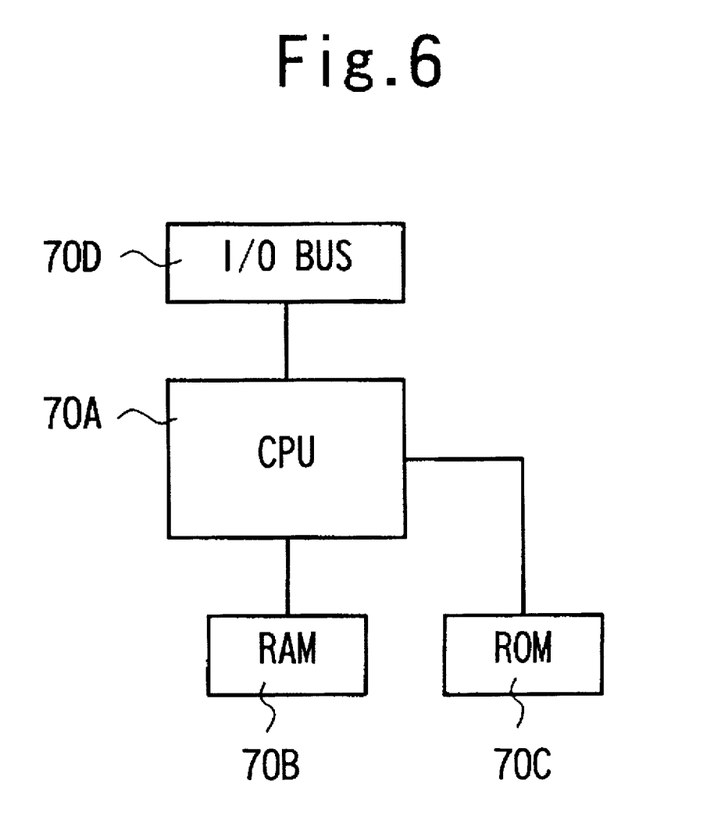
FIG. 6 is a block diagram showing an example of a control circuit in the first and second embodiments of the invention.

The control circuits 16, 70 in the first and second embodiments may be provided as a hard logic circuit. Also, as shown in FIG. 6, each control circuit may be provided as a CPU 70A, a RAM 70B storing printing data or the like, a ROM 70C storing control program of the mobile data communication device 10 and an I/O bus 70D. In this case, the pointing device 72, the infrared data transmitting/receiving device 74 and the driver circuit of the charge quantity deterioration display LED 76 are connected to the I/O bus 70D.

In the second embodiment, since the capacitor 66 stores the induction electromotive force generated in the induction coil 58, even when the input/output device is not operated, the power is supplied, and the storage contents can be held.

In addition, the mobile data communication device of the present invention is not limited to the above-mentioned embodiments, but various modifications may be made without departing from the spirit and scope of the invention. For example, the infrared data transmitting/receiving device of this embodiment may be a radio wave or wire system. Also in this embodiment, although the operation of the input device has been described in detail for purposes of simplicity, similar configuration can be provided as the output device.

Also as shown in FIG. 7, a data communication device provided with both the input device 82 and the output device 84 can be constituted. More specifically, the body frame 81A forming the holding part is in a cylindrical shape, and the input device 82 and the output device 84 are provided respectively on both ends. The input device 82 comprises a ball 86 and a two-dimensional moving amount detecting device 88. The two-dimensional moving amount detecting device 88 is constituted by a plurality of rotary encoders (not shown). Also, the output device 84 comprises an ink jet printing device 80 and a one-dimensional moving amount detecting device 82. The one-dimensional moving amount detecting device 82 is provided with one rotary encoder (not shown), and a disk 83 detecting the moving amount is mounted on the shaft of the rotary encoder.

What is claimed is:

1. A mobile data communication device comprising:

an elongated body frame having a longitudinal axis and opposed ends and forming a holding part configured to be held by an operator;

a data communication device for at least one of transmitting and receiving data installed on at least one end of the body frame;

a control circuit installed within said body frame coupled to the data communication device; and a power generating device installed within the body frame for generating and supplying power to the control circuit, wherein said power generating device is permanently secured within the body frame and does not include electric contacts to an external power source and comprises a generator that generates power due to movement of the device during operation.

2. The mobile data communication device of claim 1, wherein the power generating device comprises a generator including a rotary shaft nearly coincident with the longitudinal axis and a weight secured thereto, wherein power is generated from rotation of the rotary shaft due to movement of the device during operation.

3. The mobile data communication device of claim 2, wherein the power generating device includes a storage device for storing generated power.

4. The mobile data communication device of claim 3, further comprising an indicator that indicates residual charge quantity of the storage device.

5. The mobile data communication device of claim 4, wherein the indicator is a light emission diode.

6. The mobile data communication device of claim 2, wherein the power generating device includes a rectifier circuit.

7. The mobile data communication device of claim 2, wherein the power generating device includes a voltage stabilizing circuit.

8. The mobile data communication device of claim 2, wherein the data communication device is a pointing device.

9. A hand held data communication device for at least one of inputting and outputting data, comprising:

a body configured to be held in a hand of an operator having at least one data communication means for transferring data;

an internal self contained power generating source housed in the body for generating power, including generating means for generating power when the device is operated due to gravity, and storage means for storing generated power; and electrical connecting means for connecting the data communication means and the power generating source.

10. The hand held data communication device of claim 9, wherein the data communication means comprises a pointer coupled to an end of the hand held data communication device.

11. The hand held data communication device of claim 10, wherein the data communication means further comprises an infrared data transmission/reception device that communicates with an external device.

12. The hand held data communication device of claim 9, wherein the generating means comprises a rotary shaft with a weight secured thereto that rotates when the device is operated due to gravity, and wherein the storage means comprises a capacitor that stores power generated by the generating means.

13. The hand held data communication device of claim 9, wherein the power generating source further comprising a voltage stabilizing circuit.

14. The hand held data communication device of claim 9, further comprising indicator means for indicating a power storage state of the storage means.

15. A hand held data communications device for at least one of inputting and outputting data, comprising:

a body configured to be held in a hand of an operator having at least one data communication means for transferring data;

an internal self contained power generating source housed in the body for generating power, including generating means for generating power comprising a first induction coil alignable with a second coil connected to a power source and disposed in an adjacent device such that power is generated in the hand held communication device from electromagnetic induction, and storage means for storing generated power; and electrical connecting means for connecting the data communication means and the power generating source.

16. The hand held data communication device of claim 15, further comprising indicator means for indicating a power storage state of the storage means.

17. A mobile data communication device comprising:

an elongated body frame having a longitudinal axis and opposed ends and forming a holding part configured to be held by an operator;

a data communication device for at least one of transmitting and receiving data installed on at least one end of the body frame;

a control circuit installed within said body frame coupled to the data communication device; and a power generating device comprising a cordless transmitting system installed within the body frame for generating and supplying power to the control circuit, wherein said power generating device is permanently secured within the body frame and does not include electric contacts to an external power source and includes an induction coil installed within the body frame that is adapted to generate power through magnetic induction with another induction coil installed exterior and adjacent thereto.

18. The mobile data communication device of claim 17, further comprising, in combination:

a base part separate from the body frame and having an enclosing part for holding the body frame thereon;

another induction coil installed on the base part for supplying power to the induction coil in the body frame by electromagnetic induction that creates a magnetic field in a direction; and a power source supplying power to the induction coil installed on the base part.

19. The mobile data communication device of claim 18, wherein the enclosing part holds the body frame such that the induction coil in the body frame and the induction coil in the base part are nearly coincident in the direction of the magnetic field of the electromagnetic induction.

20. The mobile data communication device of claim 18, wherein the body frame includes a pointer on one end and the base part includes a display panel.

21. The mobile data communication device of claim 17, wherein the power generating device includes a storage device for storing induction electromotive force generated in the induction coil.

22. The mobile data communication device of claim 17, wherein the power generating device includes a rectifier circuit.

23. The mobile data communication device of claim 17, further comprising an indicator for informing residual charge quantity of the storage device.

24. The mobile data communication device of claim 23, wherein the indicator is a light emission diode.

25. The mobile data communication device of claim 17, wherein the power generating device includes a voltage stabilizing circuit.

26. The mobile data communication device of claim 17, wherein the body frame is provided with an infrared data transmitting/receiving device for transmitting and receiving data with an external device.

27. The mobile data communication device of claim 17, wherein the input device is a pointing device.

* * * * *